(12) United States Patent
Lagnelov et al.

(10) Patent No.: US 8,466,783 B2
(45) Date of Patent: Jun. 18, 2013

(54) ALARM ANALYSIS SYSTEM AND A METHOD FOR PROVIDING STATISTICS ON ALARMS FROM A PROCESS CONTROL SYSTEM

(75) Inventors: Jan Lagnelov, Vasteras (SE); Jan M Gjerseth, Vasteras (SE); Jens Axelsson, Vasteras (SE); Martin Hollender, Dossenheim (DE); Shahram Shahinzadeh, Haninge (SE)

(73) Assignee: ABB AB (SE)

( * ) Notice: Subject to any disclaimer, the term of this patent is extended or adjusted under 35 U.S.C. 154(b) by 709 days.

(21) Appl. No.: 12/701,858

(22) Filed: Feb. 8, 2010

(65) Prior Publication Data

US 2010/0141421 A1  Jun. 10, 2010

Related U.S. Application Data

(63) Continuation of application No. PCT/EP2007/058250, filed on Aug. 8, 2007.

(51) Int. Cl.
*G08B 29/00* (2006.01)

(52) U.S. Cl.
USPC ............ 340/506; 340/521; 709/203; 709/224

(58) Field of Classification Search
USPC ............ 340/506, 501, 514, 517, 521, 825.36; 709/224, 225, 229, 203, 217
See application file for complete search history.

(56) References Cited

U.S. PATENT DOCUMENTS

| | | | | |
|---|---|---|---|---|
| 7,043,661 B2* | 5/2006 | Valadarsky et al. | ............. | 702/59 |
| 7,080,398 B1* | 7/2006 | Wichelman et al. | .......... | 725/107 |
| 7,155,514 B1* | 12/2006 | Milford | ........................ | 709/225 |
| 7,237,109 B2* | 6/2007 | Scott et al. | .................... | 713/164 |
| 7,680,928 B2* | 3/2010 | Lean et al. | .................... | 709/224 |
| 7,721,152 B1* | 5/2010 | Joshi et al. | ....................... | 714/25 |
| 8,332,063 B2* | 12/2012 | Moshier | .................... | 340/572.1 |
| 2007/0001806 A1* | 1/2007 | Poll | .............................. | 340/7.59 |

FOREIGN PATENT DOCUMENTS

| | | |
|---|---|---|
| GB | 2395831 A | 6/2004 |
| WO | 9729410 A1 | 8/1997 |

OTHER PUBLICATIONS

International Search Report and Written Opinion of the International Searching Authority; PCT/EP2007/058250; Oct. 5, 2007; 8 pages.

* cited by examiner

*Primary Examiner* — Eric M Blount
(74) *Attorney, Agent, or Firm* — St. Onge Steward Johnston & Reens LLC

(57) ABSTRACT

An alarm analysis system for providing statistics on alarms collected by a process control system including an alarm server receiving and storing alarms from one or more processes supervised by the control system. The alarm analysis system is run on the alarm server and the alarm analysis system is adapted to automatically produce and display the statistics in real time based on the alarms stored in the alarm server.

12 Claims, 3 Drawing Sheets

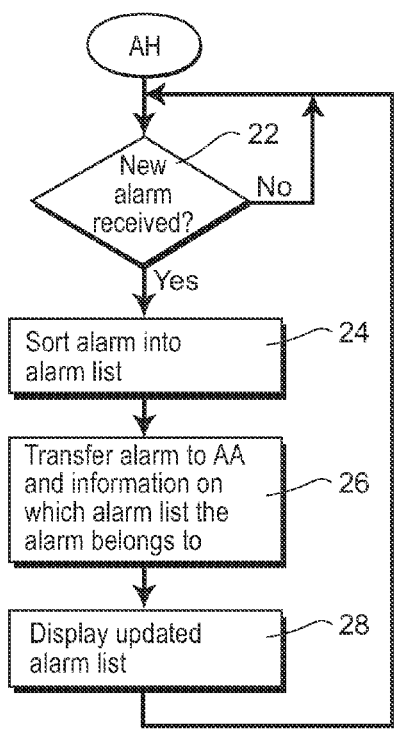
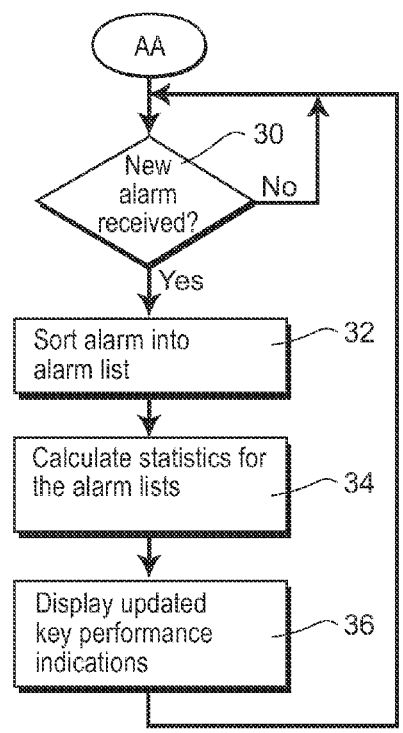
Fig. 3a
Fig. 3b

ALARM ANALYSIS SYSTEM AND A METHOD FOR PROVIDING STATISTICS ON ALARMS FROM A PROCESS CONTROL SYSTEM

CROSS-REFERENCE TO RELATED APPLICATIONS

The present application is a continuation of pending International patent application PCT/EP2007/058250 filed on Aug. 8, 2007 which designates the United States and the content of which is incorporated herein by reference.

FIELD OF THE INVENTION

The present invention relates to an alarm analysis system providing statistics on alarms collected by a process control system comprising an alarm server receiving and storing alarms from one or more process sections supervised by the control system. The invention also relates to a method for analyzing alarms collected by such a process control system.

The present invention is useful in connection with control systems for any type of industrial process such as pulp and paper industry, oil and gas industry, metal industry, and nuclear industry.

BACKGROUND OF THE INVENTION

A traditional process control system receives alarms from external equipment, such as sensors, PLC's, and controllers supervising and controlling the process. The process control system comprises an alarm system including an alarm server that puts together the alarms and produces alarm lists for the operator(s). An alarm list contains active alarms and non-active alarms that have not been acknowledged by the operator. An alarm is active e.g. if an upper limit is exceeded and becomes inactive when it is below the upper limit. The alarm lists are displayed on a human machine interface of the process control system in real time so that the operator immediately is informed about a new alarm. In a large control system, different operators can be responsible for different parts of the process, for example, an operator may be responsible for different process sections of a factory and is only interested in statistics for its own sections. Therefore it is common that the received alarms are sorted into different alarm lists and each operator can view its own alarm list including alarms from the parts of the process, which the operator is responsible for.

By sorting the alarms into different alarm lists, the number of alarms presented to a certain operator is reduced. In spite of this measure, the number of alarms presented to the operator can be extremely large and accordingly it can be difficult for the operator(s) to evaluate and act to resolve all the alarms. The number of alarms can be unreasonably high if the engineering project has not selected alarm limits carefully but rather used default limits for most actors. A known solution to this problem is to use an external alarm management system that analyzes the alarms, provides statistics on the alarms, and generates reports and trends based on the received alarms. The alarm management system calculates a plurality of key performance indicators, KPI, based on the alarms received from the control system. Example of statistics provided by the alarm management system is the ten most common alarms, the ten longest standing alarms, the number of alarms over time, and alarm priority distribution.

The alarm management system comprises a database for storing the received alarms and software for analyzing and performing statistics on the alarms stored in the database. The software and database are hosted on an external computer.

All alarms received by the process control system are transmitted to the external database that resides outside the process control system. Queries are then performed to the database, which results in reports in the form of text and diagrams. Analyzing of the alarms and calculation of the statistic is typically initiated manually of a system engineer, who demands that a certain type of statistics is provided.

The purpose of the alarm management system is to reduce the number of irrelevant alarms and make it possible to select the most important alarms among the huge amount of alarms generated. A problem with today's alarm management systems is that they add additional complexity and costs to the process control system. The external database has to be installed together with the control system, which is time consuming and adds complexity. The database is often provided by a third party vendor, which adds licensing costs. Reports generated from the database do not handle real time data, since the database reports give a snapshot of the data. Further, it is not possible to have a trend with real time updates displayed. It is also hard to know which of the alarms transmitted to database that was really presented to a particular operator.

SUMMARY OF THE INVENTION

The object of the present invention is to provide an improved alarm management system, which reduces the above-mentioned problems.

According to one aspect of the invention, this object is achieved with an alarm analysis system as defined in claim 1.

Such an alarm analysis system is characterized in that the alarm analysis system is run on the alarm server and the alarm analysis system is adapted to automatically produce the statistics in real time based on the alarms stored in the alarm server.

Thus, the alarms are analyzed directly in the process control system instead of being transferred to an external database as in the prior art. The statistics is calculated in real time in the control system based directly on the alarms stored in the alarm server. This gives the operator the possibility to view the resulting statistics directly in the process control system with real time update. Data consistence is guaranteed, since the data is generated directly from data in the alarm server in the process control system without an additional storage. Further, the statistics is automatically generated, and the update does not need to be initiated by the operator as in the prior art alarm management system. The present invention provides a continuous update in real time of statistics of alarms received by the control system. Further advantages with the invention are that no external database or external computer is needed. The software of the alarm analysis system are stored and executed on hardware, i.e. the alarm server, of the process control system.

According to an embodiment of the invention, the alarm analysis system is adapted to calculate one or more key performance indicators based on the alarms stored in the alarm server and to recalculate the performance indicators upon receiving a new alarm to the alarm server. Upon receiving an alarm, the performance indicators are automatically recalculated and presented to the operator. Thus, the operator is always provided with fresh statistics updated in real time.

The key performance indicators are generated directly in the process control system. The key performance indicators are calculated in real time and stored in the process control system. The key performance indicators make it easier for the operator or process engineer to make decisions on how to improve the alarm system. A key performance indicator provides important information to the operator or process engineer in an intelligible and easily comprehensible way.

According to a further embodiment of the invention, the alarm server is adapted to sort the alarms into a plurality of alarm lists intended to different operators, and for at least some of said alarm lists, the alarm analysis system is adapted to calculate one or more key performance indicators based on the alarms in the alarm list. According to this embodiment, key performance indicators are calculated and displayed for each of a plurality of alarm list. This embodiment makes it easy to provide each operator with statistics relevant to his part of the supervised process. As the performance indicators are calculated based on the alarms in the alarm lists, it is not necessary to sort the alarms again. Further, it is ensured that the displayed statistics is based on the alarms that were really presented to a particular operator. It will be understood that the alarms may be sorted into other alarm lists, for which no performance indicators are calculated.

According to another embodiment of the invention, the process control system comprises at least one human machine interface for displaying the alarm lists and the alarm analysis system is adapted to display the statistics on the human machine interface in real time. According to this embodiment, it is possible for the operator to view the alarm list and the statistics on the same human machine interface. Thus, it is possible to view the statistics at the same monitor as the rest of the process information. This makes it easier for the operator to analyze the alarm system and initiate possible enhancements According to a further embodiment of the invention, the human machine interfaces adapted to display a process figure illustrated in the status of the control process, and the alarm analysis system is adapted to display key performance indicators in the process figure. This embodiment further simplifies for the operator to analyze the alarm system.

According to another aspect of the invention, the object is achieved by a method as defined in claim 6. Such a method is characterized in that the method comprises automatically producing and displaying the statistics in real time based on the alarms stored in the alarm server.

According to a further aspect of the invention, the object is achieved by a computer program product directly loadable into the internal memory of a computer or a processor, comprising software code portions for performing the steps of the method according to the appended set of method claims, when the program is run on a computer. The computer program can be provided on a computer readable medium or through a network.

According to another aspect of the invention, the object is achieved by a computer readable medium having a program recorded thereon, and the program is to make a computer perform the steps of the method according to the appended set of method claims, when the program is run on the computer.

BRIEF DESCRIPTION OF THE DRAWINGS

The invention will now be explained more closely by the description of the different embodiments of the invention and with reference to the appended figures.

FIG. 3a shows a flow chart of an exemplary alarm service.

FIG. 3b shows a flow chart of an exemplary alarm analyze service.

DETAILED DESCRIPTION OF THE INVENTION

Figure 1:
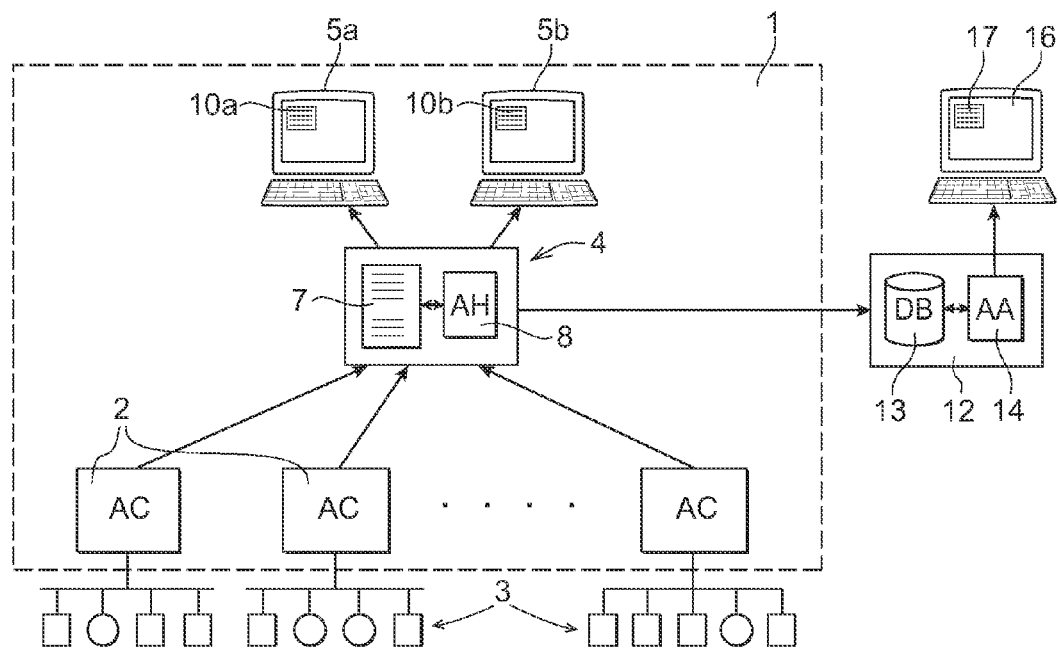
FIG. 1 shows a process control system and an alarm analysis system according to prior art.

FIG. 1 shows an example of an alarm analysis system for providing statistics and a process control system according to the prior art. The process control system 1 comprises a plurality of alarm collection units 2 adapted to receive alarms and events from external equipment 3, such as sensors, PLC's and controllers. The control system further comprises an alarm server 4 comprising hardware for processing the alarms and events, such as a central processing unit (CPU), storage means and I/O units. The control system comprises one or more, in this case two, human machine interfaces 5a-b including display screens for displaying information to the operator (s) of the control system. The alarm server 4 includes memory means 7 for storing alarm lists, and an alarm handling service 8 including software for handling the received alarms and events, for example, to sort the alarms into different alarm lists, to store the alarm lists and to provide graphical presentations of the alarm lists.

In some control systems it is sufficient to provide one single alarm list for process control. However, for control systems supervising for, example, a whole factory including different process sections, each supervised by an individual operator, it is suitable to provide one or more alarm lists for each process section of the factory. The alarm list of a process section includes alarms origin from the process section. Then, the operator only has to view the alarm list for his process section. Graphical presentations of the alarm lists are transferred to the human machine interface and are displayed on the display screen 5a-b. In the example shown in FIG. 1, graphical presentations of two alarm lists 10a-b are provided; one alarm list 10a is displayed on the human machine interfaces 5a and the other alarm list 10b is displayed on the human machine interfaces 5b.

FIG. 1 further shows an alarm analysis system according to prior art. The alarm analysis system is hosted on an external computer 12 arranged at a distance from the control system and includes a database 13 for storing alarms, and an alarm analyzing service 14 adapted to analyze the alarms, to provide statistics based on the alarms stored in the database and to provide graphical presentations of the alarm lists. The alarm management system further comprises a human machine interface including a display screen 16 on which the graphical presentation of the statistics 17 is displayed. Alarms received by the control system are transferred to the external database 13. The analyzing of the alarms and the calculation of the statistic is initiated manually of a system engineer. The system engineer chooses which type of statistic to be calculated and displayed upon initiating the calculations.

Figure 2:
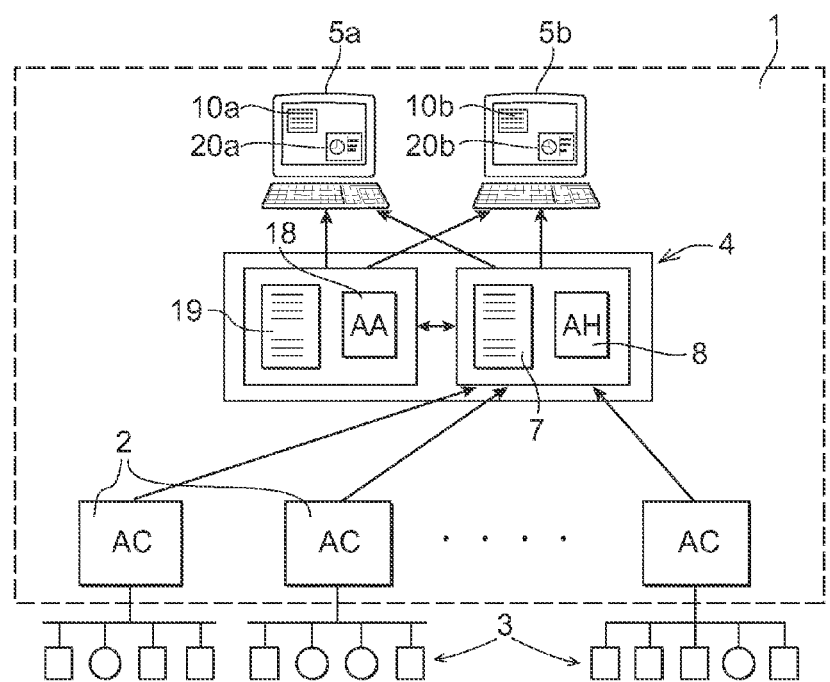
FIG. 2 shows a process control system and an alarm analysis system according to an embodiment of the invention.

FIG. 2 shows an alarm analysis system according to an embodiment of the present invention. Elements corresponding to the ones shown in FIG. 1 are given the same reference number in FIG. 2. The alarm server 4 comprises an alarm analyzing service 18 adapted to calculate statistics, such as key performance indicators, based on the alarms in the alarm lists, to provide a graphical presentation 20a-b of the statistics and to display it on the human machine interfaces 5a-b of the control system, i.e. on the same display screen as the graphical presentation 10a-b of the alarm lists are displayed. According to the invention, the alarm analyzing service 18 is a part of the alarm server 4 of the process control system 1. A copy of the alarm list(s) stored in memory means 7 is stored in memory means 19 belonging to the alarm analyzing service 18. The alarm analyzing service 18 is adapted to calculate statistics based on the alarms in the alarm lists stored in memory means 19.

Each alarm list has a client, which subscribe to certain types of alarms. Different alarm lists may subscribe to the same type of alarm, thus the same alarm can be contained in more than one alarm list. When an alarm is received by the alarm handling service 8, a subscription handler sends the alarm to the client or clients subscribing to the alarm. The alarm analyzing service 18 subscribes to alarms from the alarm handling service 8. The alarm analyzing service 18 is provide with exactly the same clients as the alarm handling services, i.e. it will subscribe to the same alarms and thus will create the same alarm lists as the alarm handling service 8. The alarm handling service 8 stores the alarm lists in memory means 7 and the alarm analyzing service 18 stores the alarm lists in memory means 19. The alarm analyzing service 18 stores the alarms according to its subscription in the alarm list in the memory means 19.

Upon receiving a new alarm from the alarm handling service 8, the alarm analyzing service 18 automatically calculates statistics in the form of key performance parameters based on the alarms in the alarm lists stored in memory means 19 and automatically generates a graphical presentation 20*a-b* of the key performance parameters. The graphical presentation 20*a-b* of the key performance parameters is displayed on the display screen(s) of the man-machine interface (s) 5*a-b*. The alarm handling service 8 generates a graphical presentation 10*a-b* of the alarm lists and provides them to the man-machine interface 5*a-b*.

As shown in FIG. 2, the first man-machine interface 5*a* views a graphical representation 10*a* of an alarm list, and a graphical representation 20*a* of statistics provided based on the alarms in the alarm list 10*a*. The human machine interface 5*b* displays another alarm list 10*b* and a graphical representation 20*b* of statistics provided based on the alarms in the alarm list 10*b*. Thereby, it is possible to display different alarm information to different operators, responsible for different sections of the process to be controlled. The alarm analyzing service 18 is provided as software, which is run on the hardware of the alarm server, 4 i.e. the same hardware as executes the alarm handling service 8.

FIG. 3*a* shows a flow chart illustrating the mains steps of the alarm handling service. FIG. 3*b* shows a flowchart illustrating the main steps of the alarm analyzing service. It will be understood that each block of the flowchart can be implemented by computer program instructions.

As shown in FIG. 3*a*, the alarm handler waits for an alarm to be received from any of the alarm collection units 2, block 22. When an alarm is received from any of the alarm collection units, the alarm is sorted into one or more alarm list, block 24. In this embodiment, the sorting is based on subscriptions made by clients for the alarm lists. The alarm is sent to each client subscribing to the alarm. The alarm is stored in the alarm lists in memory means 7. At the same time the alarm is transferred to the alarm analyzing service 18, together with information on which alarm list or lists the alarm belongs to, block 26. For example, this information includes information on which client or clients subscribe to this alarm. Thereafter, a graphical representation of the updated alarm list may be transferred to the human machine interfaces 5*a-b*, block 28. Which list is displayed in the human machine interface may depend on which alarm list the user selects to view. Thereafter, the alarm handling service waits for the next alarm to be received.

As shown in FIG. 3*b*, the alarm analyzing service waits for an alarm to be received from the alarm handling service, block 30. The new alarm is stored in the alarm list(s) in memory means 19, which subscribes to the alarm, block 32. As soon as a new alarm has been received, the alarm analyzing service calculates statistics, such as key performance indicators, based on the alarms in the alarm list belonging to the newly received alarm, block 34. As soon as the statistics has been calculated, a graphical representation of the updated statistics, such as the updated key performance indicators may be transferred to the human machine interfaces 5*a-b* and displayed on the display screen, block 36. Thereby, it is possible for the operator to view the alarm list and the statistics in the same view on the human machine interface. The display screen is automatically updated as soon as a new alarm is received. Thereby it is possible to display the statistics in real time.

Preferably, a plurality of key performance indicators are calculated and displayed. Examples of indicators are:

top ten most frequent alarms during a given time period,
priority distribution for alarms during a given time period,
identification of the alarms that have been in alarms state longest time,
how long the alarm has been active.

Figure 4:
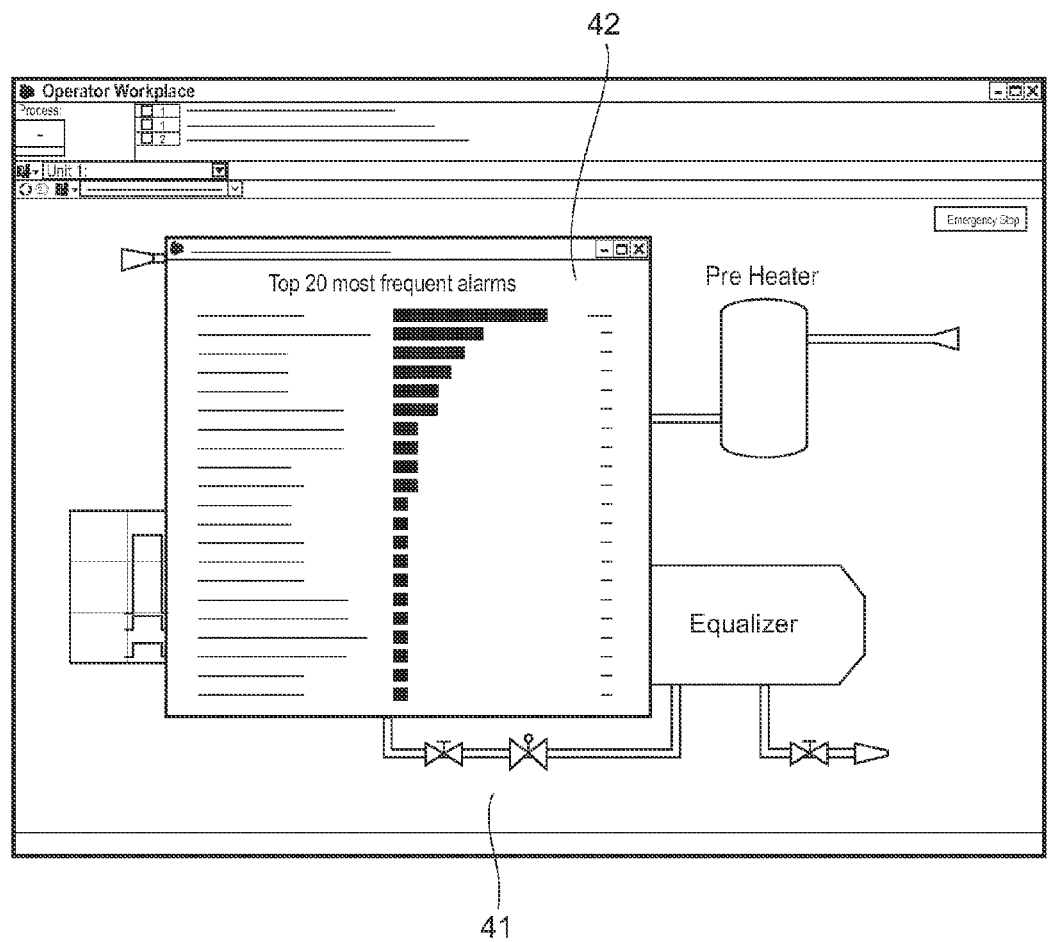
FIG. 4 shows an example of a process figure including key performance indicators displayed on a human machine interface of the control system.

FIG. 4 shows a view on a display screen of the control system showing a process FIG. 41 of a process controlled by the control system and a graphical presentation 42 of statistics of the alarms overlaying the process figure. The process figure also includes information of the status of the controlled process. The statistics shows the 20 most frequent alarms. Preferably, the statistics is updated in real time.

The statistics can be automatically displayed or the operator/process engineer can open the statistics manually e.g. by pressing an icon.

The present invention is not limited to the embodiments disclosed but may be varied and modified within the scope of the following claims. For example, in the embodiment described above the statistics is calculated based on alarms, however it is also possible that the statistics can be calculated based on events and event lists.

What is claimed is:

1. An alarm analysis system for providing statistics on alarms collected by a process control system comprising an alarm server receiving and storing alarms from one or more processes supervised by the control system, characterized in that the alarm analysis system is run on the alarm server and the alarm analysis system is adapted to automatically produce the statistics in real time based on the alarms stored in the alarm server.

2. The alarm analysis system according to claim 1, wherein the alarm analysis system is adapted to calculate one or more key performance indicators based on the alarms stored in the alarm server and to recalculate the key performance indicators upon receiving a new alarm to the alarm server.

3. The alarm analysis system according to claim 1, wherein the alarm server is adapted to sort the alarms into a plurality of alarm lists intended to different operators, and for at least some of said alarm lists, the alarm analysis system is adapted to calculate one or more key performance indicators based on the alarms in the alarm list.

4. The alarm analysis system according to claim 1, wherein the process control system comprises at least one human-machine interface for displaying the alarm lists and the alarm analysis system is adapted to display said statistics on said human-machine interface.

5. The alarm analysis system according to claim 4, wherein the human-machine interface is adapted to display a process figure illustrating the status of the controlled process, and the alarm analysis system is adapted to display said statistics on the process figure.

6. A method for providing statistics on alarms collected by a process control system comprising an alarm server receiving and storing alarms from one or more processes supervised by the control system, characterized in that the method comprises automatically producing the statistics in real time based on the alarms stored in the alarm server.

7. The method according to claim 6, wherein the method comprises automatically producing one or more key performance indicators based on the alarms stored in the alarm server and recalculating the key performance indicators upon receiving a new alarm to the alarm server.

8. The method according to claim 6, wherein the alarm server is adapted to sort the alarms into a plurality of alarm lists intended to different operators, and producing statistics comprises calculating, for at least some of said alarm lists, one or more key performance indicators for each alarm list.

9. The method according to claim 6, wherein the process control system comprises at least one human-machine interface for displaying the alarm lists, and the method comprises displaying said statistics on said human-machine interface in real time.

10. The method according to claim 9, wherein the human-machine interface is adapted to display a process figure illustrating the status of the controlled process, and the method comprises displaying said statistics on the process figure.

11. A computer program product directly loadable into the internal memory of a computer, comprising software for performing the steps of claim 6.

12. A computer-readable medium, having a program recorded thereon, where the program is to make a computer perform the steps of claim 6, when said program is run on the computer.

\* \* \* \* \*